(12) United States Patent
Pfister et al.

(10) Patent No.: US 10,981,324 B2
(45) Date of Patent: Apr. 20, 2021

(54) METHOD AND DEVICE OF LAYERWISE MANUFACTURING A THREE-DIMENSIONAL OBJECT OF A POWDERY MATERIAL

(71) Applicant: EOS GmbH Electro Optical Systems, Krailling (DE)

(72) Inventors: Andreas Pfister, Munich (DE); Mandy Gersch, Ulm (DE)

(73) Assignee: EOS GmbH Electro Optical Systems, Krailling (DE)

( * ) Notice: Subject to any disclaimer, the term of this patent is extended or adjusted under 35 U.S.C. 154(b) by 368 days.

(21) Appl. No.: 15/961,349

(22) Filed: Apr. 24, 2018

(65) Prior Publication Data

US 2018/0236711 A1    Aug. 23, 2018

(30) Foreign Application Priority Data

May 21, 2008   (DE) ............... 10 2008 024 465.1

(51) Int. Cl.
| | |
|---|---|
| *B33Y 30/00* | (2015.01) |
| *B29C 64/153* | (2017.01) |
| *B33Y 70/00* | (2020.01) |
| *B33Y 40/00* | (2020.01) |
| *B29B 17/00* | (2006.01) |
| *B29C 64/35* | (2017.01) |
| *B29C 64/357* | (2017.01) |
| *B29C 64/268* | (2017.01) |
| *B33Y 10/00* | (2015.01) |
| *B29K 77/00* | (2006.01) |

(52) U.S. Cl.
CPC ........ *B29C 64/153* (2017.08); *B29B 17/0005* (2013.01); *B29C 64/268* (2017.08); *B29C 64/35* (2017.08); *B29C 64/357* (2017.08); *B33Y 30/00* (2014.12); *B33Y 40/00* (2014.12); *B33Y 70/00* (2014.12); *B29K 2077/00* (2013.01); *B33Y 10/00* (2014.12); *Y02W 30/62* (2015.05); *Y10T 428/2982* (2015.01)

(58) Field of Classification Search
CPC ..... B29C 64/153; B29C 64/357; B29C 64/35; B29C 64/268; B33Y 30/00; B33Y 40/00; B33Y 70/00; B33Y 10/00
See application file for complete search history.

(56) References Cited

U.S. PATENT DOCUMENTS

| | | | |
|---|---|---|---|
| 4,334,056 | A | 6/1982 | Meyer et al. |
| 4,938,816 | A | 7/1990 | Beaman et al. |

(Continued)

FOREIGN PATENT DOCUMENTS

| | | |
|---|---|---|
| DE | 101 05 504 | 8/2002 |
| DE | 103 30 590 | 4/2004 |

(Continued)

*Primary Examiner* — Jacob T Minskey
(74) *Attorney, Agent, or Firm* — _ Locke Lord LLP; Nicholas J. Di Ceglie, Jr.

(57) ABSTRACT

A method of manufacturing a three-dimensional object by selectively solidifying layers of a powdery material (3a) at the locations corresponding to the cross-section of the object (3) in the respective layers by impact of electromagnetic radiation (7a) is provided, where in a plastic powder, preferably polyamide, is used as powder, wherein the non-solidified powder (3a') is subjected to a treatment by water or water vapour at increased temperatures after manufacturing the object, subsequently dried and thereafter used again to build-up a new object.

16 Claims, 3 Drawing Sheets

(56) References Cited

U.S. PATENT DOCUMENTS

| | | |
|---|---|---|
| 5,527,877 A | 6/1996 | Dickens, Jr. et al. |
| 5,990,268 A | 11/1999 | Dickens, Jr. et al. |
| 6,245,281 B1 | 6/2001 | Scholten et al. |
| 7,468,405 B2 | 12/2008 | Allen et al. |
| 7,491,792 B2 | 2/2009 | Monsheimer et al. |
| 7,794,647 B1 | 9/2010 | Deckard |
| 2004/0102539 A1 | 5/2004 | Monsheimer et al. |
| 2004/0138344 A1 | 7/2004 | Allen et al. |
| 2005/0074550 A1 | 4/2005 | Leuterer et al. |
| 2006/0071359 A1 | 4/2006 | Monsheimer et al. |
| 2007/0241482 A1 | 10/2007 | Giller et al. |
| 2009/0045553 A1 | 2/2009 | Weidinger et al. |

FOREIGN PATENT DOCUMENTS

| | | |
|---|---|---|
| DE | 10 2004 047 876 | 4/2006 |
| DE | 603 03 275 | 10/2006 |
| DE | 10 2006 023 484 | 11/2007 |
| EP | 1413595 A1 | 4/2004 |
| EP | 0 911 142 | 8/2005 |
| JP | 11-216779 | 8/1999 |
| JP | 2004-143460 | 5/2004 |
| JP | 2004-524995 | 8/2004 |
| WO | 2005/097475 | 1/2005 |

METHOD AND DEVICE OF LAYERWISE MANUFACTURING A THREE-DIMENSIONAL OBJECT OF A POWDERY MATERIAL

The invention relates a method and device of layerwise manufacturing a three-dimensional object of a powdery material. In particular, the invention relates to a method of selective laser sintering, that is a "laser sintering method" as used herein, and to a laser sintering device, which can manufacture a three-dimensional object of plastic powder, in particular of polyamide, in a cost-saving and environmentally friendly manner.

A laser sintering method and a laser sintering device according to the preamble of patent claim 1 and patent claim 9, respectively, are known from DE 101 05 504 A1, for instance. In the method, in particular a plastic powder such as polyamide is used. Herein, polyamide 12 having a melting point of 185-189° C., an enthalpy of fusion of 112±17 kJ/mol and a solidification temperature of 138-143° C. is very suitable, as it is described in EP-0 911 142. The powder has an average grit size of 50-150 μm.

In the known method, a built-up process uses a certain amount of waste powder, that is, a powder remaining as non-sintered powder of one or several previous built-up processes.

Due to the stay in the process chamber during manufacturing of the three-dimensional object, the non-solidified powder is thermically and/or thermooxidatively damaged so that it has other material properties and also other processing parameters than fresh powder. Therefore, it can be mixed up with fresh powder only in a certain percentage, without compromising the built-up process and the building quality. The so-called fresh-up rate is the ratio between fresh powder and waste powder of the powder to be used in the built-up process. It should be as low as possible, since the costs for the fresh powder can be saved.

In DE 101 05 504 A1, a pre-treatment of the waste powder or of a mixture of waste powder and fresh powder before solidifying by liquefaction is proposed, so as to reduce the effects of aging damages and to enable admixing more waste powder. However, the pre-treatment by liquefaction does not remove all aging damages of the powder. In particular, a high ratio of waste powder causes unsatisfying surface properties of outer walls of the object by so-called pockmarks, which are also termed as "sink marks" or "orange peel".

From WO 2005/097475 and DE 10 2004 047876 A1, laser sintering methods and laser sintering devices are known, which reduce the problem of pockmarks by using a determined material having increased stability in the laser sintering process and, thus, less aging damages, as it is used as waste powder. For instance, the powder according to DE 10 2004 047876 A1 is characterized in that it comprises a mixture of diamide- and diamine-controlled polyamide and/or co-polyamide. However, the user is forced to use this specific powder, which has in turn other properties than the previously used habitual powder and probably does not fulfil all requirements.

From DE 10 2006 023 484.7, it is further known that the problem of pockmarks is removed by mechanically compressing the powder building material during application of a layer. This requires a specific dispenser. From US 2004/0138344 A1, it is known to increase the melting point and the enthalpy of fusion of polyamide by contacting the polyamide with water or water vapour. Thereby, some polyamide can be made suitable for laser sintering.

It is the object of the invention to provide a method and a device of manufacturing a three-dimensional object and, in particular, a laser sintering method and a laser sintering device, which can reduce the fresh-up rate and, therefore, the costs of the method, and which can enhance the environmental compatibility as well.

This object is achieved by a method according to patent claim 1 and by a device according to patent claim 9. Further developments of the invention are defined in the dependent claims.

The method according to claim 1 has the advantage that a conventional plastic powder for laser sintering such as polyamide 12, as it is known from the above mentioned EP-0 911 142, can be used, wherein the properties thereof are well-known.

The method can be performed in common plastic laser sintering devices. The treatment of the waste powder can be conducted in a separate container at the site of the laser sintering machine or in a central recycling site. Therefore, no complicated retro fitting of existing machines is required. The separate container for treatment of the waste powder can also be used as an additional device for the existing laser sintering machine.

The treatment of the waste powder is cost-saving and environmentally friendly since no specific chemicals are used. Consequently, the environmental compatibility of the laser sintering method can be enhanced by the method according to the present invention, in which no or only a few useless waste powder ends up in garbage.

The treatment of the waste powder is more cost-saving than manufacturing of fresh powder, and it is also economical for small powder amounts. Therefore, the costs of the laser sintering method can be lowered.

Further features and effects of the invention are indicated in the description of an embodiment on the basis of the following figures.

Figure 1:
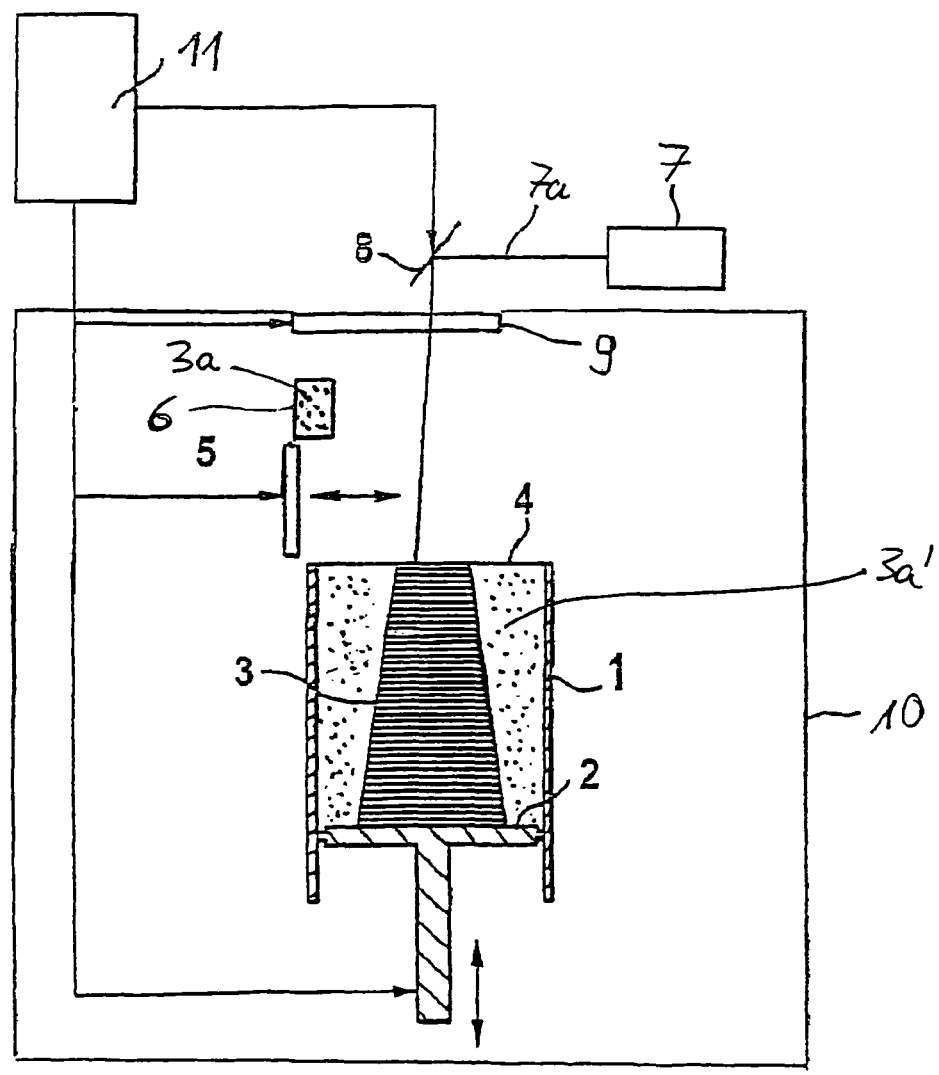
FIG. 1 shows a schematic view of an embodiment of the invention exemplified by a laser sintering device.

The laser sintering device according to FIG. 1 comprises a frame 1 which opens in the upper side and has therein a platform 2, which is movable in the vertical direction and supports the object 3 to be built-up and defines a building area. The platform 2 is adjusted in the vertical direction such that the layer of the object, which is to be solidified, lies in a working plane 4. Further, a dispenser 5 is provided to apply powdery building material 3a which is to be solidified by electromagnetic radiation. The building material 3a is supplied to the dispenser 5 from a storage container 6. Further, the device comprises a laser 7 generating a laser beam 7a, which is deflected by a deflection means 8 into an input window 9 and therefrom into the process chamber 10, and which is focused to a predetermined point within the working plane 4.

Further, a control unit 11 is provided to control the components of the device in a coordinated manner to perform the building process.

Outside the process chamber 10, a device 12 for treating non-solidified waste powder is provided. This device comprises a water vapour generating means (not shown), a heating means to bring the water vapour on a predetermined temperature and a drying means. The device for treating the waste powder 12 can be an autoclave, for instance. The drying means can be a hot air blower, for instance. The device for treating the waste powder further comprises a control (not shown) to adjust the temperature and the time of the treatment.

The device for treating the waste powder 12 can optionally be connected with the process chamber and the storage container via a deliver system (not shown). Thereby, the non-solidified waste powder can be sucked and supplied again to the storage container after the treatment. The device for treating the waste powder 12 is optionally connected only with the storage container, so that the waste powder is supplied after removal of the object with the surrounding non-solidified material. In a further modification, the device for treating the waste powder 12 can also be integrated in the storage container.

Optionally, the post treatment of the waste powder in the open frame (1) together with the pieces is conducted after the job.

Herein, the complete open frame (replaceable frame) is removed from the laser sintering machine and subjected the post treatment process in a device 12.

In a further modification, the device for treating the waste powder 12 is provided at a farther place, and the waste powder can be transported thereto and transported back to the laser sintering machine after the treatment as well.

In the following, the method according to the invention is described. Preferably, polyamide 12 is used as the powder, as it is described in EP 0 911 142. The powder usually has a grit size of about 50 μm to about 150 μm. The powder may have additives such as riddle additives, pigments, fillers, flame resistants or further additives.

The powder 3a is applied layer by layer from the storage container 6 onto the platform and onto a previously solidified layer, respectively, and solidified by the laser at the locations in the layer corresponding to the cross-section of the object. After manufacturing the object, non-sintered powder 3a' surrounding the object is supplied to the device for treatment of waste powder 12. Here, it is treated by water vapour for about 1 up to about 48 hours at temperatures of at least 130° C. and at most 10° C. below the melting point of the powder. For polyamide 12 and polyamide 11, the treatment is preferably performed at about 130° C. up to about 170° C. Thereafter, it is dried in a drying cabinet, which is part of the device 12. At the same time, the drying temperature is lower than 100° C., preferably between 50-70° C. The time and the temperature of the treatment depends on the age of the waste powder. The older the powder is, as the case may be when it has been used for some manufacturing processes before, the longer it must be treated. By increasing the temperature, the recovery can be accelerated. However, the required temperature is below the melting points so as to prevent baking of the powder grains.

By aging in the laser sintering process, the molar mass of the polyamide is aggregated by post-condensation. The waste powder 3a' supplied to the treatment device 12 has a noticeable higher molar weight than fresh powder. In accordance to the age and the temperature load, the molar weight of the waste powder is increased. For instance, the waste powder according to the present invention before the treatment has a molar weight $M_n$ (numeric average) of more than 20,000 g/mol, preferably of 21,000-100,000 g/mol, further preferred of 22,000-50,000 and most preferred of 25,000-35,000, and $M_w$ (average weight) of more than 40,000 g/mol, preferably of 45,000-200,000, further preferred of 50,000-150,000 and most preferred of 60,000-100,000.

After the treatment, the recycled powder has a molar weight, which is at least 5%, preferably 10-70% and further preferred 20-50% below the molar weight of the waste powder. The recycled powder has an $M_n$ (numeric average) of less than 40,000 g/mol, preferably of 15,000-30,000 g/mol, further preferred of 17,000-25,000 and most preferred of 19,000-21,000, and $M_w$ (weight average) of less than 100,000 g/mol, preferably of 35,000-70,000 and further preferred of 37,000-50,000 and most preferred of 38,000-45,000.

By aging during the laser sintering process, the balance between carboxylic end groups and amino end groups of polyamide 12 in a direction to an excess of one of both end groups, preferably of the carboxylic end group, can be shifted. The waste powder 3a' supplied to the treatment device 12 has preferably an excess of one end group, preferably of the carboxylic end group, at least of 4:1 up to at most 200:1. In accordance to the age of the powder, the excess can be 4:1, 5:1, etc., 100:1 up to 200:1. By the treatment, the excess of end groups is preferably decreased. Further preferred, the excess of the end groups, preferably of the carboxylic end group, is set between about 2:1 to about 3:1.

A concrete embodiment uses a powder which is available under the trade name "Primepart" of EOS GmbH Electro Optical Systems, and which corresponds to the powder as described in EP-0 911 142 and has further additives. Fresh powder, which has not been used in a laser sintering process yet, usually has the following parameters: molar mass (numeric average) $M_n$=19,600 g/mol, molar mass (weight average) $M_w$=42,500 (g/mol). After the sintering process, the waste powder has the following parameters: $M_n$=27,200 g/mol, $M_w$=85,600 g/mol. This waste powder is treated for different times in the treatment device by hot vapour of 140° C., and thereafter, it is dried. The treated waste powder has then values as indicated in the table. In accordance to the treatment time, it is possible to reset the molar weight of the fresh powder. It does not depend on the molar weight of the fresh powder and of the waste powder, respectively. Therefore, it is not essential whether the waste powder comes from one cycle or several cycles.

| Samples | molar mass determination (GPC) | |
|---|---|---|
| | Mn | Mw |
| fresh powder | 19500 | 42600 |
| waste powder | 27200 | 85600 |
| 140° C., 1 h | 25800 | 77100 |
| 140° C., 6 h | 24500 | 70300 |
| 140° C., 12 h | 20300 | 54000 |
| 140° C., 24 h | 19100 | 48600 |

The values have been determined by means of gel permeation chromatography (GPC) in hexafluor isopropanole. The determination of the molar mass has been performed computer-aided by means of the so-called strip method. Herein, the eluted peak is divided in several equidistant volume slices which are identical with the measurement frequency. By the calibration, the elution volumina are then transformed to molar masses. As a calibration step standard, tightly distributed polymethyl methacrylate (PMMA) solved in HFIP has been used. The proper procedure and evaluation are known by the skilled person.

Figure 2:
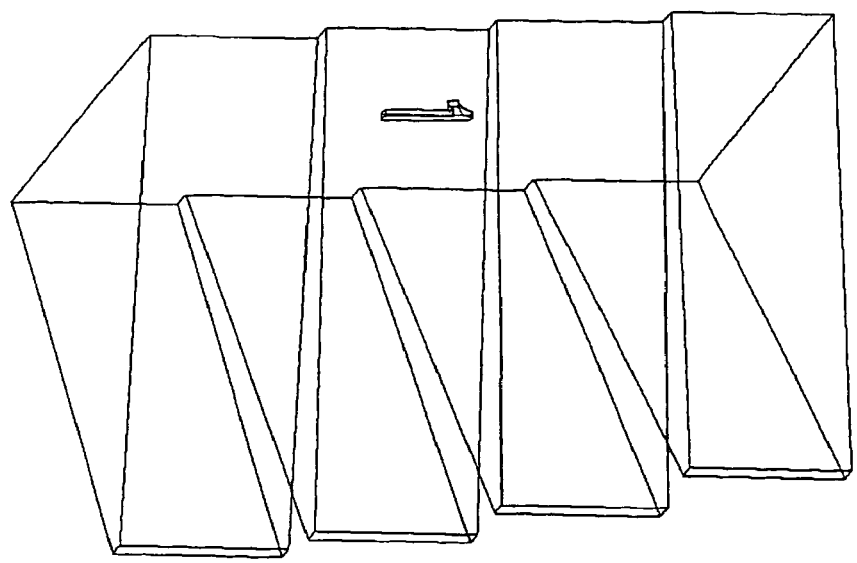
FIG. 2 shows a test geometry of a piece to be lasersintered.

The treated powder is then used for a new laser sintering process. The laser sintering pieces manufactured by the treated primepart-powder (laser sintering machine EOS P380, parameters mechanics, compromise, surface, for instance) has, in accordance to the location in the built-up area, noticeably less or no sink marks anymore as compared with waste powder. The check of the tendency of sink marks can be checked during laser sintering by a relative simple wedge test geometry having different inclined slopes of at least 15-30°, and preferably of 0-50°. In this respect, 0° corresponds to a vertical plane in the Z-axis of the building space. The minimum size of the wedge is 45×25×30 mm (length×width×height). A typical test geometry is depicted in FIG. 2.

Figure 3:
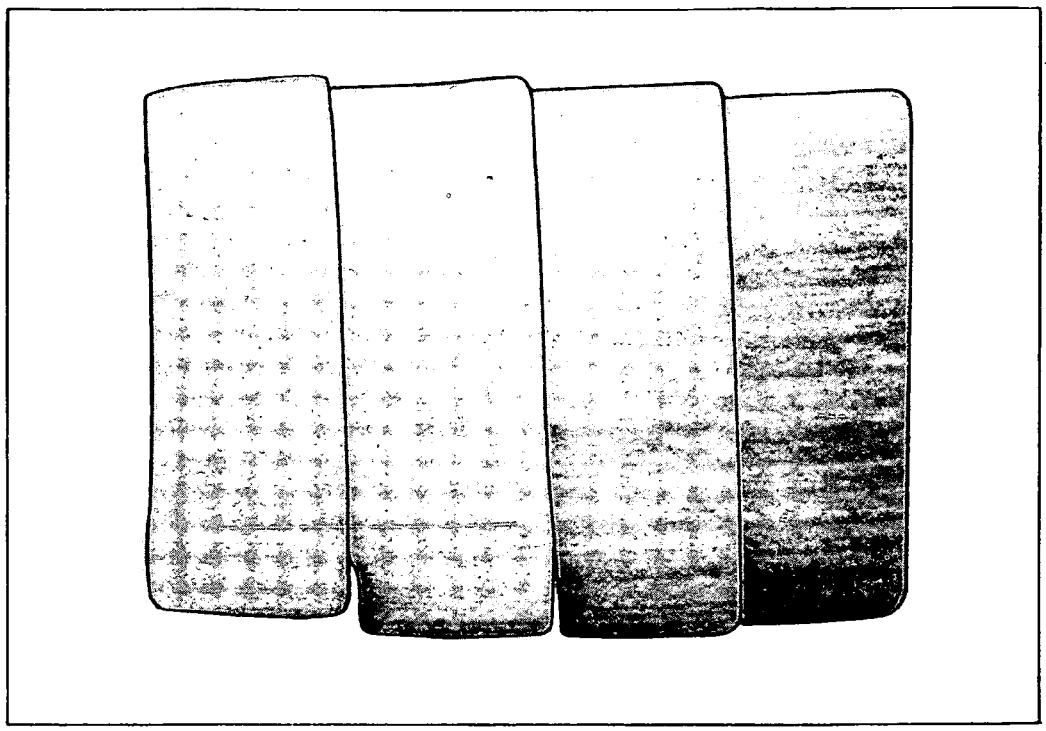
FIG. 3 shows a piece which is lasersintered of 100% waste powder.
Figure 4:
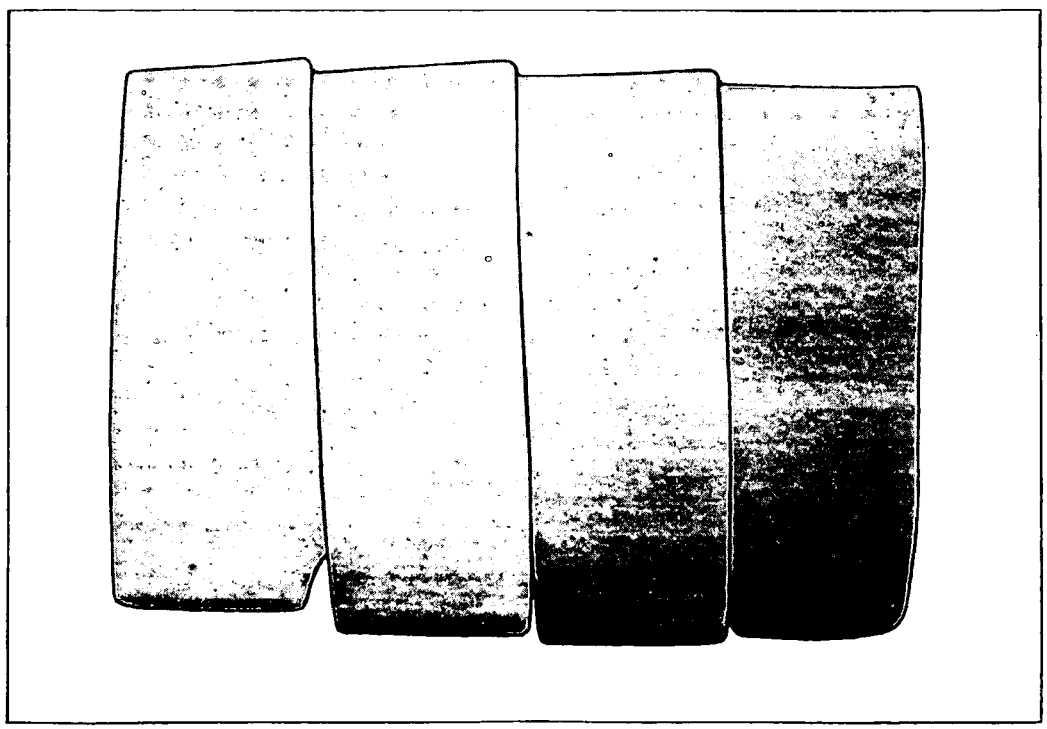
FIG. 4 shows a lasersintered piece having no sink marks anymore and which is manufactured by the method of the present invention by recycled waste powder.

FIG. 3 shows a lasersintered piece manufactured of 100% waste powder of polyamide. The sink marks are clearly shown. FIG. 4 shows a lasersintered piece having the same geometry, wherein the powder has been subjected to the above mentioned treatment.

Sink marks are not present.

By the treatment of the waste powder, the melting point and the focal point, respectively, of the powder nearly remain constant or is slightly lowered. Generally, the decrease is 0-5° C. The melting- and focal point of the powder can be determined by dynamic difference calometry (DKK and DSC, respectively) according to DIN 53765.

The treatment can either be conducted by the user of the laser sintering machine in the treatment device 12 or by a central unit comprising the treatment device 12 and receiving the waste powder for recycling.

The method is not restricted to the use of polyamide 12. Other aliphatic polyamide such as polyamide 6, polyamide 11, polyamide 46, polyamide 66, polyamide 1010, polyamide 1012, polyamide 1212 as well as their copolymers and other partly aromatic polyamide such as polyamide PA6T/6I, poly-M-xylylenadipinamide (PAMXD6), polyamide 6/6T, polyamide PA6T/66, PA4T/46 can be used as well. As a matter of principle, all polyamides can be used where an increase in the molar weight of non-solidified powder occurs by post-condensation during the laser sintering process in the process chamber.

The method is also applicable to all plastic powders, where the non-solidified powder is subjected to an aging process in the process chamber resulting to a shift of the ratio of carboxylic end groups and amino end groups.

The method and the device are not restricted to the laser sintering method and the laser sintering device, either. As a matter of principle, they are applicable to all methods of layer-wise manufacturing a three-dimensional object, where conditions (high temperatures) act on the non-solidified powder in the process chamber which makes the powder aging. Further examples for these methods are mask sintering and electron beam sintering.

The method is not restricted to a treatment only by water or water vapour. It is also possible to add further additives such as condensation catalysts or amide generating chain regulators in the treatment. Such catalysts and regulators are well-known by the skilled person.

The invention claimed is:

1. A method of manufacturing a three-dimensional object by selectively solidifying of layers of a powdery material at locations corresponding to the cross-section of the object in the respective layer by application of electromagnetic radiation, the method further comprising:
    after manufacturing the object, subjection a non-solidified powder to a treatment with water or water vapour and thereafter using the treated non-solidified powder again to build-up a new object.

2. The method according to claim 1, wherein the powder comprises a polyamide.

3. The method according to claim 1, wherein the powder comprises polyamide 12.

4. The method according to claim 1, further comprising treating the non-solidified powder at increased temperature.

5. The method according to claim 1, further comprising drying the powder after the treatment.

6. The method according claim 1, further comprising selecting the time of the treatment in accordance to the age of the powder.

7. The method according to claim 1, wherein the powder comprises a polyamide and the method comprises treating the non-solidified powder with hot vapour at a temperature of about 130° C. up to about 170° C.

8. The method according to claim 1, wherein the powder comprises a polyamide and the method comprises treating the non-solidified powder with hot vapour at a temperature of about 130° C. up to about 150° C.

9. The method according to claim 1, wherein the powder includes additives selected from the group consisting of ripple additives, fillers, pigments or flame resistants.

10. The method according to claim 1, wherein the electromagnetic radiation is laser radiation.

11. The method according to claim 1, wherein the treatment with water or water vapour is carried out in a device for treatment of non-solidified powder, which device is included within laser sintering machine or which is a separate container and receives the waste powder for recycling.

12. The method according to claim 1, wherein after manufacturing the object and after subjection the non-solidified powder to the treatment with water or water vapour, the non-solidified powder is returned into a storage container for re-use of the non-solidified powder to build-up a new object.

13. A method of treating powdery polymer material for recycling waste powder of a previously performed method of manufacturing a three-dimensional object, the method of treatment comprising:
    separating a non-solidified polymer powder material, which has not been solidified during use in the previous method of manufacturing a three-dimensional object by selectively solidifying layers of a powdery material at locations corresponding to the cross-section of the object in the respective layer by application of electromagnetic radiation, from the object after manufacturing,
    treating the non-solidified powder by water or water vapour, and
    providing the treated powder as recycled powdery polymer material for manufacturing a new three-dimensional object.

14. The method according to claim 13, wherein the polymer powder comprises polyamide.

15. The method according to claim 13, wherein the polymer powder comprises polyamide having a molar weight Mn (numeric average) of more than about 20.000 g/mol and at most about 100.000 g/mol before treatment.

16. The method according to claim 13, wherein after the treatment the treated powder has a molar weight which is at least 5% below the molar weight of the untreated waste powder.

* * * * *